April 20, 1954 C. MYERS 2,676,243

TELEVISION LIGHTING APPARATUS

Filed Oct. 16, 1951 2 Sheets-Sheet 1

Inventor:
Carmel Myers
by Her Attorneys,
Darby & Darby

Inventor:
Carmel Myers
by her Attorneys,
Darby & Darby

Patented Apr. 20, 1954 2,676,243

UNITED STATES PATENT OFFICE 2,676,243

TELEVISION LIGHTING APPARATUS

Carmel Myers, New York, N. Y.

Application October 16, 1951, Serial No. 251,485

2 Claims. (Cl. 240—1.3)

This invention relates to television lighting and involves a combination with a television pickup camera and a light source mounted thereon of means for automatically varying the intensity of illumination of the televised area in so far as it is affected by said light source by and in accordance with movements of the pickup camera with respect to the scene being televised.

A broad object of this invention is to provide means for automatically decreasing and increasing the intensity of illumination of the light source mounted on a television pickup camera as the camera is moved towards and away from the televised area for the purpose of maintaining at least approximately uniform illumination of that area for various positions of pickup cameras.

A more specific object of the invention is the provision of electro-mechanical mechanism controlled by the movements of the pickup camera dolly for effecting constancy of illumination.

Another more specific object of the invention is the provision of electro-mechanical means controlled by the intensity of illumination of the area being televised for varying the excitation of a light source mounted on the television pickup camera as it is moved with respect to the area being televised.

A still more specific object of the invention is the provision of means as an element of either of such combinations whereby a manual preliminary adjustment of the intensity of illumination of the area being televised can be effected.

Other and more detailed objects of the invention will be apparent from the following description of the embodiments thereof illustrated in the attached drawings.

In accordance with present day practice the televising of a scene, particularly in the studio, involves frequent movement of the pickup camera with respect to the area being televised, and usually particularly with respect to an individual performer. The result is that one or another of the pickup cameras televising the scene will be moved sometimes towards and sometimes away from a particular actor.

Supplementary lighting sources are frequently mounted on the television pickup camera, with the result that the movements of the camera as described above will bring the lighting source on the camera at one time nearer to or farther away from the area being televised or the particular performer being featured. It naturally follows that these movements of the lighting sources with the pickup camera change the intensity of illumination of the televised area or actor from a preadjusted correct intensity to a greater or lesser intensity, depending upon the camera movements. At the start of a scene the pickup camera will be very definitely placed with regard to the action and the light source or sources mounted thereon will be adjusted in conjunction with the adjustment of the overall illumination so that a particular area or actor is correctly illuminated. Naturally, when the camera is moved closer to the actor for example, he (or she) will become over illuminated, or if the camera is moved away, under illuminated. The object of this invention is to provide mechanism whereby the light source or sources mounted on the camera will have their energization automatically increased or decreased as the camera moves away from or towards the actor, so as to maintain a substantially constant illumination in accordance with the original requirement for lighting the scene, and individuals involved.

Figure 1:
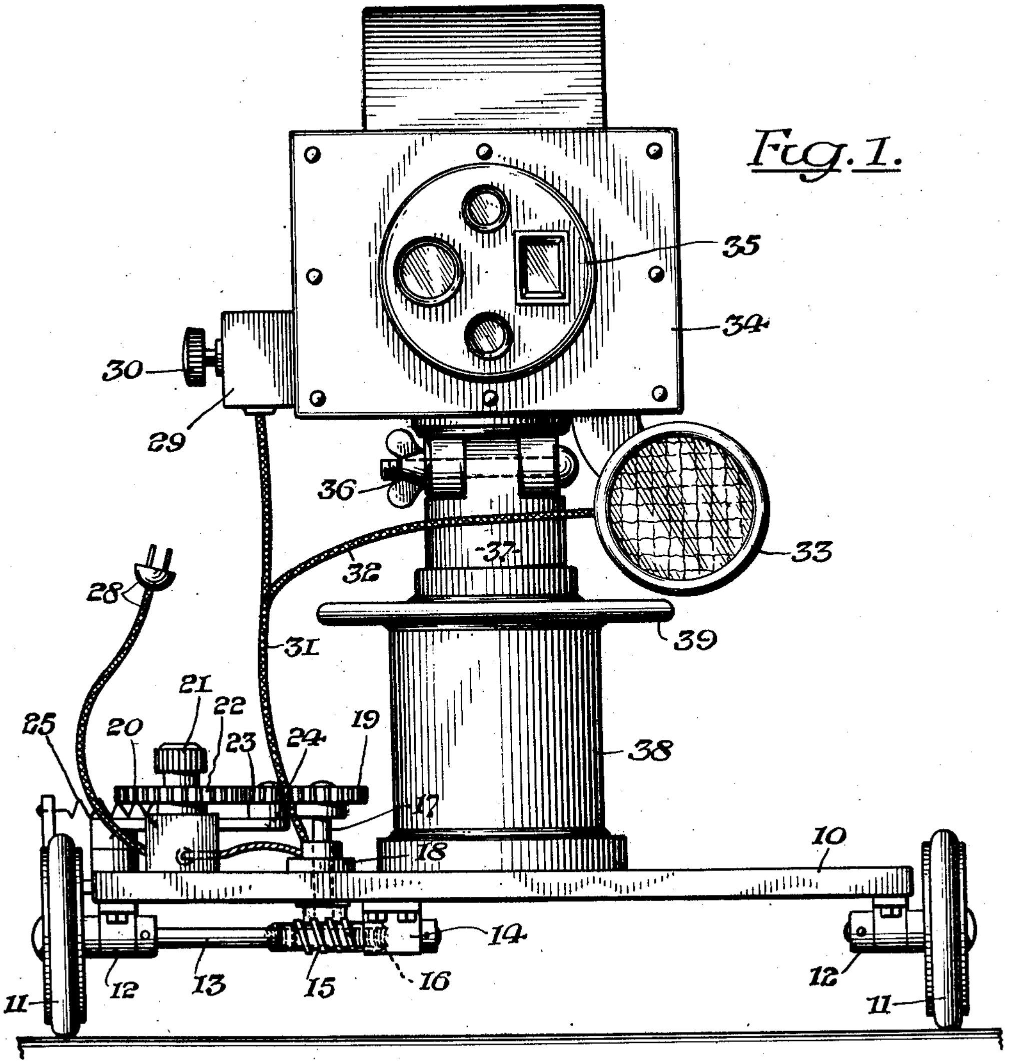
Figure 1 is a front elevational view with some parts diagrammatically illustrated of a television lighting equipment in accordance with the objects above stated.

Referring to Figure 1, there is illustrated a television pickup camera of the type commonly used in the television studio, in sufficient detail for the purpose of adequately illustrating the invention. The camera is shown mounted on a dolly or movable platform consisting of a base plate 10 mounted on a series of wheels 11 which are journaled in bearings 12 attached to the base plate. Mounted on this base plate is the usual standard or column 38 on which is vertically movable a pedestal 37 the vertical height of which can be adjusted by means of hand wheel 39. The camera housing 34, provided with the usual lens turret 35, is mounted on the pedestal 37 for pivotal movement on a horizontal axis by means of a hinged edge 36. The showing of this head is simplified since in more elaborate installations this head may include a construction whereby the camera housing 34 may also be rotated on a vertical axis. However, since the invention is not concerned with the details of construction of the camera, these refinements are not included.

As illustrated, a suitable light source 33 is mounted on the camera housing 34 in any suitable manner. It is not unusual to provide more than one of these light sources in some instances, and even in the case of the one illustrated, its exact position can be varied, as is well understood. This light source is only shown in diagrammatic form, since the invention is not limited to the particular form of lighting source. It is intended that the one illustrated will consist of an incandescent lamp of suitable intensity having a reflector of suitable shape and behind a transparent or translucent lens suited to the purpose. It is likewise understood that if desired the supporting fixture for the light source 33 may include construction whereby the direction of the axis of the light beam can be varied as conditions required. Since this function is not essential to the invention, adjustable fixtures of this type have not been illustrated.

The shaft 13 of one of the wheels for the dolly is extended as shown, and its free end is supported in a second bearing 14 attached to the underside of the bedplate 10. Secured to the shaft 13 for rotation with it is a worm 15 meshing with a worm wheel 16 mounted on a vertical shaft 17 journaled for rotation in a bearing 18. Attached to the upper end of the shaft 17 is a spur gear 19. At 20 is diagrammatically illustrated a resistor or other suitable form of voltage adjusting device which includes a movable contact connected to a shaft to which is attached a hand wheel 21 and a spur gear 22. At 23 is a pinion which provides a driving connection from the spur gear 19 to the spur gear 20 and pinion 23 is rotatably mounted on the end of a horizontal arm 24 which in turn is pivotally mounted upon a stud 26 attached to the top of the voltage adjusting device 20. A spring 25 anchored at any suitable fixed location at one end, connected at its other end to the lever 24, is so arranged with respect to the pivotal stud 26 as to provide an over center action so as to hold the pinion 23 in mesh with the gears 19 and 22 when the arm 24 is in the position shown in Figure 3, and to hold it against the fixed stud 27 when it is in the dotted position.

Figures 2, 3:
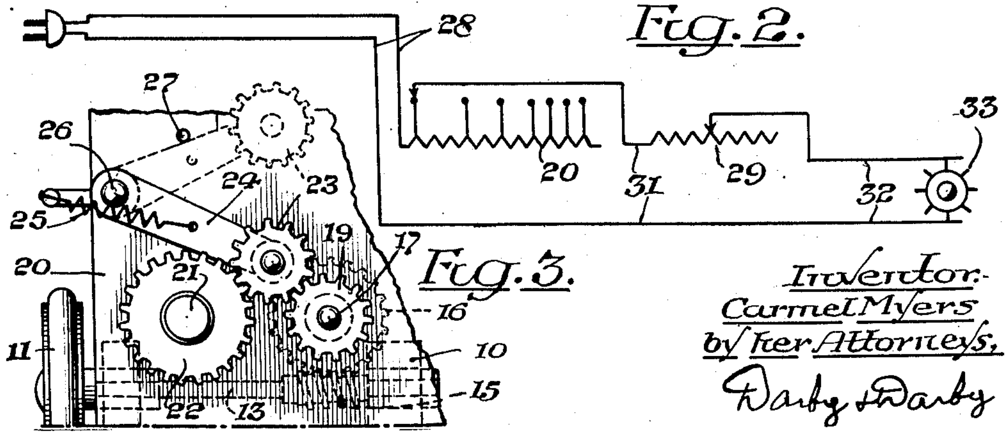
Figure 2 is a simplified circuit diagram of the mechanism involved.
Figure 3 is a fragmentary detailed plan view of a part of the mechanism of Figure 1.

At 28 is shown a flexible cable provided with a plug connector whereby connection may be made to any suitable available current outlet. As shown in Figure 2, one of the conductors of the cable 28 is connected to one end of the voltage adjusting device 20 which in this case is illustrated as a non-inductive resistance. The other conductor of the cable is connected to one terminal of the light source 33 through portions of the circuit which include the cables 31 and 32. As shown in Figure 1, cable 31 extends from the voltage adjuster 20 to a manually adjustable voltage regulator 29, preferably mounted on the side of the camera housing 34. This voltage adjuster includes a manually operated knob 30, and as illustrated in Figure 2, it may consist of a non-inductive resistance having a movable slider or cap which can be operated by the knob 30. The circuit includes the branch cable 32 by means of which the circuit to the light source 33 is completed.

It is recognized that the intensity of illumination of a light source with respect to a particular area varies inversely with the square of the distance of the light source from that area. It follows, therefore, that the voltage adjusting device 20 must have a non-linear characteristic. Thus, in accordance with the above law the resistor 20 must be constructed so that the movement of its contact arm controlled by the shaft to which the knob 21 and the cap 22 are attached will vary in accordance with the inverse square law referred to above. Resistors and voltage varying devices of this type are well known in the art, so that it is deemed a diagrammatic illustration thereof is sufficient as represented by the unequally located tabs, Fig. 2, for the resistor 20. The resistor 29 is connected in series therewith and the action thereof in circuit is adjusted by movement of its slider by the knob 30.

In the operation of this device, assuming that the camera has been initially placed with respect to the scene at a starting point, and assuming that overall illumination has been adjusted, the lever 24 can be moved to the dotted position shown in Figure 3 and the movable contacts of resistors 20 and 29 can be manually adjusted by means of the knobs 21 and 30 to provide the desired supplemental lighting from the source 33. Lever 24 can then be moved back to full line position, Figure 3, and when the camera dolly is subsequently moved closer to or farther away from the scene, the movable contact of the resistor 20 will automatically be adjusted by reason of its driving connection with the wheel 11 and its shaft 13 to maintain the original illumination of the scene or object. The lighting and action schedule is of course known beforehand, and if the first movement of the camera, for example, is away from the object rather than towards it, the original setting of the slider for resistor 20 can be arranged at the proper tap, so that when movement of the dolly does occur the desired change of resistance in the circuit can be effected. Likewise, at any time during the action if for any reason it is desired to readjust the light source 33, this can be effected manually by actuation of either or both of the control knobs 21 and 30.

Figure 4:
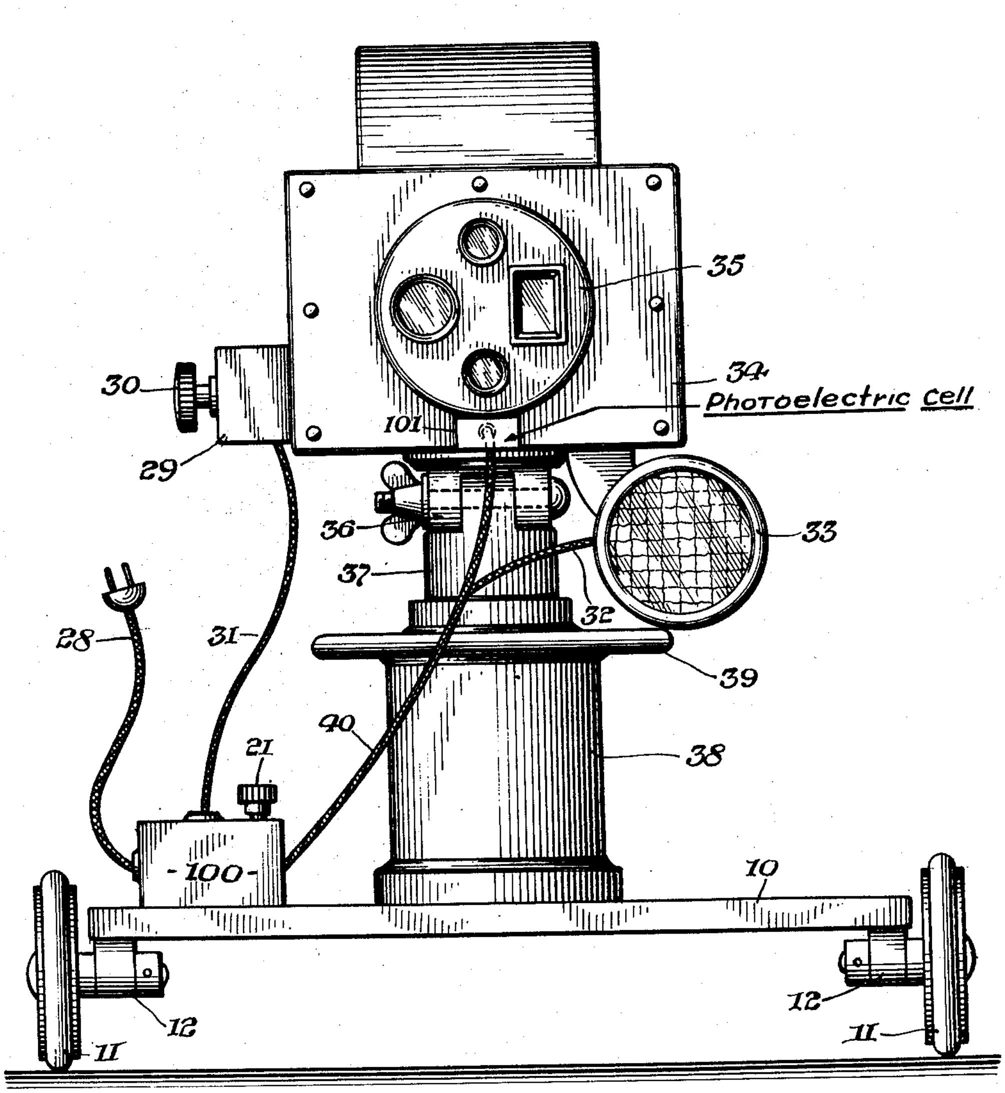
Figure 4 is a view similar to that of Figure 1, showing a modified form of equipment.

The system of Figure 4 operates to produce the same general result as that of the system of Figure 1 in an equivalent but different way. The camera details are the same, as are the dolly details, with the exception that shaft 13 and the parts operated thereby have been eliminated. In this case control is effected by means of a photo-electric cell 101 mounted at some suitable place on the camera housing 34. At 100 is diagrammatically illustrated a vacuum tube amplifier circuit controlled by the photo-cell 101 which is connected thereto by means of a cable 40 which includes the branch cable 32. The diagrammatically illustrated mechanism 100 also includes any suitable and well known form of electromagnetically operated voltage controller such as for example an electric motor operated dimmer, auto transformer, or the like. As before, the manually adjustable voltage regulator 29 is mounted on the camera housing and connected to the element 100, as is the power supply cable 28.

It is very well known in the electronics arts to control the vacuum tube amplifier circuit which may take many forms by means of the current from a photo-electric cell. It is equally well known that the output current of such an amplifier may be used directly to actuate an electro-magnetic operator to in turn operate a voltage regulator. With this system the light reflected from a particular area of the scene being photographed or from a particular actor, including the increment of illumination caused by the light source 30, will actuate the photo-electric cell 100 to thereby control the device 100 to vary the energization of the light source 33 in the proper direction to maintain substantially constant illumination thereof for all movements of the light source with the pickup camera within the limits of the device. As before the voltage regulator 100 can include a manual adjusting knob 21 by means of which preliminary or intermediate settings of the voltage regulator 100 can be effected as in the case of the system of Figure 1. Since the energization of the photocell will vary inversely with its position with respect to the object being illuminated, it is apparent that the output of the amplifier can be similarly varied so that the electro-magnetic operator for the voltage regulator will be directly controlled by the output of the amplifier. However, as is well known in the art, a suitable form of voltage regulator or driving connections for the movable contact arm thereof may be modified to give any other desired response to the movements of the camera. Since various elements by means of which these clearly stated objects can be obtained are well known in the electro-mechanical arts, detailed illustration thereof seems unnecessary.

From the above description it will be apparent to those skilled in the art that the objects of this invention can be accomplished in a number of specifically different ways and I do not, therefore, desire to be strictly limited to those illustrated in the attached drawings, but only as required by the appended claims.

What is claimed is:

1. A combination as described comprising a movable television camera, a light source movable with said camera, means for energizing said source, means actuated with the movement of said camera for varying the intensity of illumination of said source to maintain a substantially constant illumination of an area of the scene being televised by said camera, a wheeled dolly upon which said camera is mounted, a voltage regulating device carried by said dolly, and means actuated by and in accordance with the movements of said dolly for adjusting said voltage regulating device including a driving connection from one wheel of said dolly to said voltage regulating device having a clutch for breaking said connection.

2. A combination as described comprising a movable television camera, a light source movable with said camera, means for energizing said source, means actuated with the movement of said camera for varying the intensity of illumination of said source to maintain a substantially constant illumination of an area of the scene being televised by said camera, said last means including a voltage regulating device, a gear train driven by movements of said camera for actuating said device, means for interrupting said gear train, and a handle for actuating said voltage regulating device.

References Cited in the file of this patent

UNITED STATES PATENTS

| Number | Name | Date |
|---|---|---|
| 947,490 | Gwodz | Jan. 25, 1910 |
| 2,200,736 | Bedford et al. | May 14, 1940 |
| 2,208,403 | Winchester | July 16, 1940 |
| 2,239,379 | Bucky | Apr. 22, 1941 |
| 2,420,198 | Rosenthal | May 6, 1947 |
| 2,596,376 | De Goeij | Mar. 13, 1952 |

FOREIGN PATENTS

| Number | Country | Date |
|---|---|---|
| 610,146 | Germany | Mar. 4, 1935 |